Nov. 30, 1965  J. J. McCABE  3,220,782
MACHINE TOOL
Original Filed Dec. 23, 1959
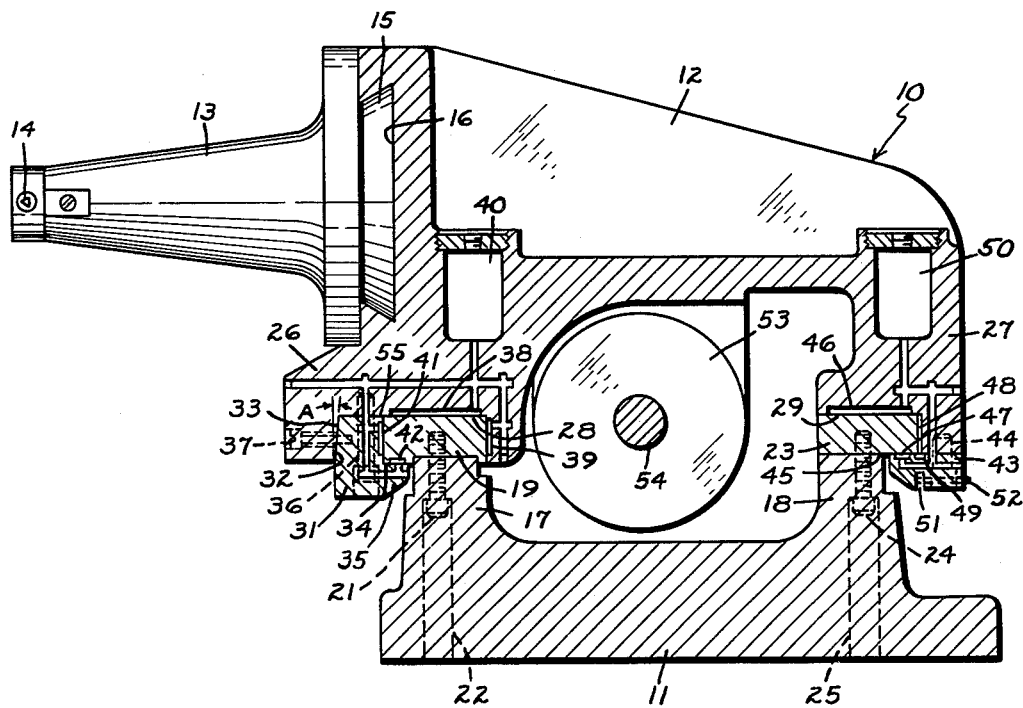
INVENTOR.
John J. McCabe
BY
Norman S. Blodgett
Attorney United States Patent Office 3,220,782
Patented Nov. 30, 1965

3,220,782
MACHINE TOOL
John J. McCabe, Worcester, Mass., assignor to The Heald Machine Company, Worcester, Mass., a corporation of Delaware
Continuation of application Ser. No. 861,521, Dec. 23, 1959. This application May 17, 1963, Ser. No. 285,180
5 Claims. (Cl. 308—3)

This invention relates to a machine tool and, more particularly, to a manner of constructing the sliding ways in a machine tool. This is a continuation of patent application Serial Number 861,521, filed December 23, 1959 and now abandoned.

In the past, it was common practice in the construction of machine tools to construct the ways in such a manner that a separate piece of metal called a "gib" was used to compensate for minor differences in dimension and to bring about close fitting. Generally speaking, this gib was an elongated tapered member which was inserted in a space between the male and female members of the ways and, because of its taper, the gib could be moved longitudinally to produce a close fit. Being long and thin and being subjected to compressive forces from the ends to cause it to fit tightly, it was apt to buckle in the center and produce a different fit at the center portion of the ways than at the ends. This brought about a motion of the sliding table known as "fishtailing" in which, as the table moves over the ways, it rotates about the narrow point in the ways caused by the bow in the gib. These and other difficulties experienced with the prior art devices have been obviated in a novel manner by the present invention.

It is, therefore, an outstanding object of the invention to provide a slide construction permitting a table or the like to move over its ways in a true linear fashion without any rotative movement of the table.

Another object of this invention is the provision of a way construction providing for extremely accurate location of the mating surfaces.

A further object of the present invention is the provision of a way construction in which the main adjusting member is substantially free of distortion.

With these and other objects in view, as will be apparent to those skilled in the art, the invention resides in the combination of parts set forth in the specification and covered by the claims appended hereto.

The character of the invention, however, may be best understood by reference to one of its structural forms as illustrated by the accompanying drawing in which the single figure is a vertical sectional view of a machine tool taken in a plane which is perpendicular to its ways.

Referring to the drawing, it can be seen that the machine tool, indicated generally by the reference numeral 10, consists generally of a base 11 on which is mounted a table 12, which (for the purposes of illustration) is shown as supporting a boring head 13. The boring head is provided with a cutting tool 14 and is attached to extend in a generally horizontal direction transversely of the table ways by means of a dove-tail 15 which fits in a similarly-formed groove 16 located on the side of the table. Extending upwardly from the base 11 are two elongated abutments 17 and 18. Fastened to the upper edge of the abutment 17 is a hardened steel way 19, the connection between the abutment and the way being by means of a series of bolts 21 which extend upwardly from the base 11 through bores 22. In a similar manner, a hardened steel way 23 is bolted to the upper edge of the abutment 18 by means of bolts 24 extending through bores 25 in the base. Extending downwardly from the table 12 and overlying the abutments 17 and 18 are elongated abutments 26 and 27, respectively. Formed in the lower edge of the abutment 26 is a groove 28 of generally rectangular cross-section in which the way 19 resides. In a similar manner, a two-sided groove 29 is formed on the inner side of the abutment 27 and the way 23 lies within this groove. The groove 28 is much wider than the way 19 and in the space remaining lies a gib 31. The gib 31 is generally L-shaped in cross-section and is elongated to fit entirely along the length of the way 19 in its groove 28 without taper in the longitudinal direction. Along one side of the groove 28 it is provided with a side surface 32 which is inclined to the vertical at a small angle A, the tangent of which, in the preferred embodiment, is $\frac{1}{10}$, this angle being in the order of 5°43'. A correspondingly-inclined surface 33 is provided on the gib 31. The way 19 is considerably wider than the abutment 17 so that an edge of the way extends outwardly of the abutment and is provided with a horizontal undersurface 34, under which lies a horizontal leg 35 of the gib 31. Suitable bolts 36 extend vertically upwardly through the gib 31 into the table 12 at suitable intervals along the length of the ways. Similarly, a series of bolts 37 extend through the abutment 26 of the table 12 into the gib in a horizontal direction. The upper horizontal surface of the groove 28 is provided with an oil pocket 38 which lies against the upper horizontal surface of the way 19. A similar oil pocket 39 is formed on the inner vertical surface of the groove 28 and lies in opposition to the inner vertical surface of the way 19. The gib 31 is provided with an oil pocket 41 which lies against the outer vertical surface of the way 19, and the undersurface 34 of the way is provided with a similar oil pocket 42 which lies against the horizontal uppersurface of the leg 35 of the gib. The oil pockets 38, 39, 41 and 42 are suitably connected by passages formed in the table 12 to an oil reservoir 40 in the upper part of the table and oil is fed by gravity to the oil pockets.

Attached to the lower edge of the abutment 27 is a clamping plate 43 which is fastened thereto by means of a series of bolts 44 at one edge thereof. The other free edge extends under the groove 29 and also under a horizontal undersurface 45 of the way 23. An oil pocket 46 is formed in the horizontal surface of the groove 29 and overlies the upper horizontal surface of the way 23. Similarly, an oil recess or pocket 47 is formed on the upper horizontal surface of the clamping plate 43 and underlies the outwardly projecting edge or undersurface 45 of the way 23. The oil pockets 46 and 47 are suitably connected by passages to an oil reservoir 50 which is formed in the upper part of the table 12 and which supplies oil to the pockets by gravity. It should be noted that the outward vertical surface of the way 23 does not contact the corresponding vertical surface of the groove 29 and a space 48 exists therebetween. Underlying this space and extending on either side of it is a shallow groove 49 formed in the upper surface of the clamping plate 43. Extending upwardly from the undersurface of the clamping plate 43 is a deep slot 51 which extends along the entire length of the way and divides the clamp into a first and a second portion. Extending through that portion of the clamping plate which lies outwardly of the groove 51 is a series of adjusting screws 52 which extends through that portion into the slot 51 and on occasion press against the opposite wall of the slot.

Mounted on the underside of the table 12 is a hydraulic linear actuator 53 in the form of a cylinder whose body is firmly attached to the undersurface of the table 12 between the abutments 26 and 27. It extends downwardly into the space between the abutments 17 and 18 of the base 11. The actuator has a piston rod 54 whose outer end is attached to the base 11, the cylinder thus providing for longitudinal motion between the table 12 and the base 11.

The operation of the invention will now be readily understood in view of the above description. The four surfaces formed by the groove 28 and the gib 31 totally surround the way 19 and the oil pockets provide for smooth sliding between them. It is important, however, in order to assure correct linear motion without rotation or lateral shifting of the table relative to the base 11, that the inward vertical surface of the groove 28 and the inner vertical surface of the gib 31 press tightly on the corresponding vertical sides of the way 19 and that there be no backlash between them. In order to produce such a tight fit during assembly, it is necessary only to remove a slight amount of material from the inclined surface 33 of the gib 31. Large amounts of material removed from this surface 55 will produce very slight thickening of the gib and cause the inner vertical surface (that is to say, the surface opposite the inclined side surface 33) to move closer to the inner vertical surface of the groove 28, so that the distance between them is reduced. Since the tangent of the angle A is one-tenth, the removal of a thousandth of an inch from the surface 33, which is quite readily done with modern machine equipment, will produce a change in dimension of a very small amount in the thickness of the gib. The amount that must be removed from the surface 33 can be readily measured during the assembly of the machine by use of a simple gage inserted between the surface 32 and the outer vertical surface of the way 19 just before the gib 31 is to be fastened in place. It can be seen that, with the accuracy present in modern machine tools, very slight changes in gib thickness can be produced and, thus, the fit of the members can be very accurate. At the other side of the machine the weight of the table 12 is carried between the horizontal surface of the way 23 and the horizontal surface of the groove 29 only. Any horizontal motion of the table due to expansion and contraction under thermal changes or due to adjustments of the mechanism associated with the abutment 17 of the base will be compensated for by a change in the space 48. It is necessary, however, that the mating horizontal surfaces of the way and groove be held constantly together, and for that reason the clamping member 43 has been provided. The groove 49 and the slot 51 provide for a simple construction which approximates a spring-biased hinged construction. In other words, the inner part of the clamping member is readily bent relative to the other part and returns afterward to its original position. In assembling the machine, the screws 52 will be rotated until the slot 51 is opened up, this being possible because of the bending properties of the clamping member. Then, material is removed from the upper surface of this inner portion of the clamping member, which is the part which engages the undersurface 45 of the way 23. The screws are then backed off and the clamping plate returns to its original position. In this way a clamping plate is provided which has an automatic spring bias to a loose position away from the surface 45. The only way that the upper surface of the clamping member can be pressed against the undersurface 45 is by rotating the screws 52 and forcing it against that surface. This would not be true, of course, if one attempted to make the upper surface of both portions of the clamping member lie in exactly the same horizontal plane; there could possibly be some projection or warping which would give less than the optimum fit of the clamping member against the undersurface of the way 23.

It will be understood that the bores in the gib 31, which are occupied by the bolts 36, are made with a large enough tolerance so that substantial adjustment of the gib 31 can take place in a horizontal direction without the bolts 36 engaging the upper part of the bores in which they rest. The horizontal adjustments of the gib 31 will be quite small and the bolt tolerance large.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine, comprising
   (a) a base,
   (b) a table mounted on the base for linear movement thereon,
   (c) an abutment extending upwardly from the base and extending longitudinally in the direction of table movement,
   (d) a groove of generally rectangular cross-section and a way of generally rectangular cross-section forming the engaging surfaces of the table and the base abutment, the way having one side contacting one side of the groove, there being a substantial space between the opposite side of the way and the opposite side of the groove,
   (e) a gib occupying the said space, the gib having one side which engages the opposite side of the way, the opposite side of the gib and the said opposite side of the groove mating and being formed with a slight inclination to the said one side of the groove and the said one side of the gib,
   (f) a first series of fastening members spaced longitudinally of the gib, extending at right angles to the said opposite side of the abutment, and serving to draw the said opposite side of the gib tightly against the said opposite side of the groove, and
   (g) a second series of fastening members spaced longitudinally of the gib, extending parallel to the said opposite side of the abutment, and serving to draw a horizontal side of the gib tightly against a horizontal surface of the groove.

2. A machine, comprising
   (a) a base,
   (b) a table mounted on the base for linear movement thereon,
   (c) two spaced parallel abutments extending upwardly from the base and extending longitudinally in the direction of table movement,
   (d) a groove of generally rectangular cross-section and a way of generally rectangular cross-section forming the engaging surfaces of a first table abutment and the corresponding base abutment, the way having one side contacting one side of the groove, there being a substantial space between the opposite side of the way and the opposite side of the groove,
   (e) an elongated non-tapered gib occupying the said space, the gib having one side which engages the opposite side of the way, the opposite side of the gib and the said opposite side of the groove mating and being formed with a slight inclination to the said one side of the groove and the said one side of the gib,
   (f) a first series of fastening members spaced longitudinally of the gib, extending at right angles to the said opposite side of the abutment, and serving to draw the said opposite side of the gib tightly against the said opposite side of the groove, and
   (g) a second series of fastening members spaced longitudinally of the gib, extending parallel to the said opposite side of the abutment, and serving to draw a horizontal side of the gib tightly against a horizontal surface of the groove, the gib having a laterally-extending lip with an upper horizontal surface adapted to engage an undersurface of the way.

3. A machine, comprising
   (a) a base,
   (b) a table mounted on the base for linear movement thereon, (c) an abutment extending upwardly from the base and extending longitudinally in the direction of table movement, (d) a groove of generally rectangular cross-section and a way of generally rectangular cross-section forming the engaging surfaces of the table and the base abutment, the way having one side contacting one side of the groove, there being a substantial space between the opposite side of the way and the opposite side of the groove, (e) a gib occupying the said space, the gib having one side which engages the opposite side of the way, the opposite side of the gib and the said opposite side of the groove mating and being formed with a slight inclination to the said one side of the groove and the said one side of the gib, (f) a first series of fastening members spaced longitudinally of the gib, extending at right angles to the said opposite side of the abutment, and serving to draw the said opposite side of the gib tightly against the said opposite side of the groove, and (g) a second series of fastening members spaced longitudinally of the gib, extending parallel to the said opposite side of the abutment, and serving to draw a horizontal side of the gib tightly against a horizontal surface of the groove, the gib having been formed to fit exactly between the inclined surface of the groove and the facing vertical surface of the way by the removal of a predetermined amount of material from the inclined surface of the gib.

4. A machine tool, comprising a base, a table mounted on the base for linear movement thereon, two spaced, parallel abutments elongated in the direction of table movement extending upwardly from the base, two abutments extending downwardly from the table for sliding engagement with the base abutments, a groove of generally rectangular cross-section and a way of generally rectangular cross-section forming the engaging surfaces of a first table abutment and a base abutment, the way having one side contacting one side of the groove, there being a substantial space between the opposite side of the way and the opposite side of the groove, a gib occupying the said space, the gib having one side which engages the opposite side of the way, the opposite side of the gib and the said opposite side of the groove mating and being formed with a slight inclination to the said one side of the groove and the said one side of the gib, a groove and way forming the engaging surfaces of the second table abutment, a clamping member fastened to the said other table abutment, the clamping member having a first portion thereof adjacent the groove which first portion presses against a surface of the way facing away from the groove, the clamping member being formed with a deep slot permitting bending of the first portion relative to a second portion, and a threaded member threadedly engaged with the said second portion and bearing against the first portion to bring about this said bending.

5. A machine tool, comprising a base, a table mounted on the base for linear movement thereon, the table residing in sliding engagement with the base, a groove of generally rectangular cross-section and a way of generally rectangular cross-section forming the engaging surfaces of the table and the base, the way having one side contacting one side of the groove, there being a substantial space between the opposite side of the way and the opposite side of the groove, a gib occupying the said space, the gib having one side which engages the opposite side of the way, the opposite side of the gib and the opposite side of the groove mating and being formed with a slight inclination to the said one side of the groove and the said one side of the gib, a similar groove and way forming the engaging surfaces of the other table abutments and base abutment, a clamping member fastened to the said other table abutments, the clamping member having a shallow recess formed in a first portion adjacent the groove, the first portion pressing against the surface of the way facing away from the groove, the clamping member being formed with a deep slot permitting bending of the said first portion of the member relative to a second portion, and a threaded member threadedly engaging the said second portion and bearing against the first portion to bring about the said bending.

References Cited by the Examiner
UNITED STATES PATENTS

| | | |
|---|---|---|
| 685,348 | 10/1901 | Richards. |
| 973,415 | 10/1910 | Eberhardt _____ 308—3 |
| 2,370,384 | 2/1945 | Williamson _____ 77—3 |

WILLIAM W. DYER, Jr., *Primary Examiner.*